United States Patent

[11] 3,607,430

| [72] | Inventor | Roland L. Glover<br>Yonkers, N.Y. |
|------|----------|-----------------------------------|
| [21] | Appl. No. | 800,906 |
| [22] | Filed | Feb. 20, 1969 |
| [45] | Patented | Sept. 21, 1971 |
| [73] | Assignee | Union Carbide Corporation<br>New York, N.Y. |

[54] MANUFACTURE OF FLAT PRIMARY GALVANIC CELLS WITH TWO HALF CELLS
3 Claims, 1 Drawing Fig.

[52] U.S. Cl. ............................................. 136/111,
    136/175
[51] Int. Cl. ........................................... H01m 21/04
[50] Field of Search .................................. 136/132,
    111, 166, 175

[56] References Cited
UNITED STATES PATENTS
2,745,894  5/1956  Nowotny .................. 136/111

| 2,880,259 | 3/1959 | Nowotny | 136/111 |
| 3,060,256 | 10/1962 | Paulson | 136/111 |
| 3,239,380 | 3/1966 | Berchielli | 136/111 |
| 3,353,999 | 11/1967 | Osborn | 136/111 |

*Primary Examiner*—Allen B. Curtis
*Assistant Examiner*—C. F. Le Fevour
*Attorneys*—Paul A. Rose, John F. Hohmann and John R. Doherty ABSTRACT: In the manufacture of thin flat primary galvanic cells a cathode laminate is formed of cathode-collector, cathodic depolarizer mix and separator and placed on a web of nonconductive plastic film. An anode laminate is formed of sheet anode metal and a second web of nonconductive plastic film. The laminates are juxtaposed with a layer of immobilized electrolyte between anode and separator and marginal portions of the two webs are heat-sealed together to finish the cell.

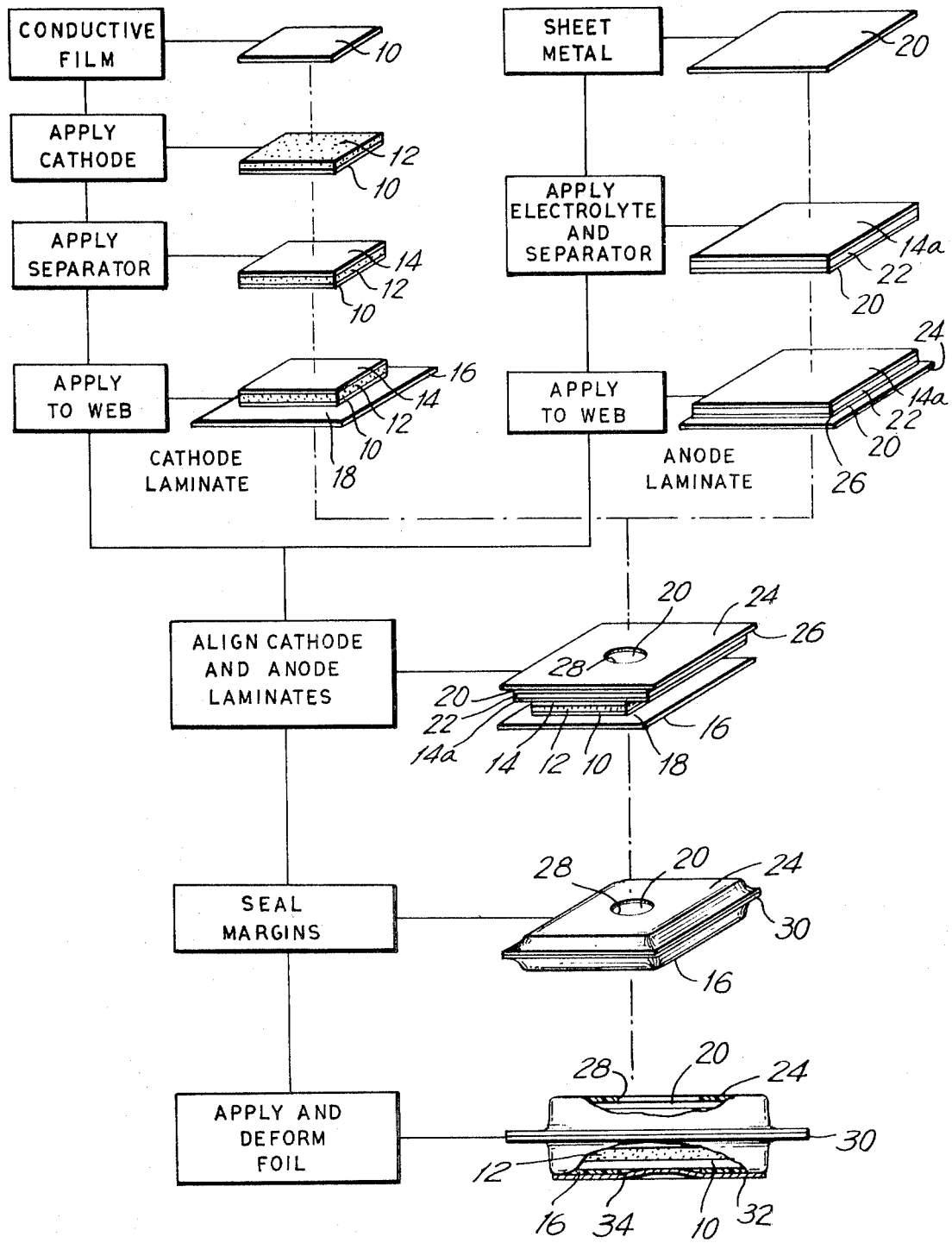

ered with extrusion, printing, stenciling or doctoring of a dry cathode mix of manganese dioxide and carbon co-

MANUFACTURE OF FLAT PRIMARY GALVANIC CELLS WITH TWO HALF CELLS

This invention relates to flat primary galvanic cells and refers more particularly to an improved method for manufacturing such cells.

With the growth of portable electrically powered devices such as radios, tape-recorders and the like, and particularly those of thin, compact design, has come an increasing demand for thin, flat batteries for powering them. Although many types of flat cells have been developed in the past for such use, few, if any, have proved to have all of the characteristics required. Cells of the type described, for instance, in Soltis, U.S. Pat. No. 2,870,235 and Krueger, U.S. Pat. No. 2,995,614, although providing excellent service characteristics, have found only limited use partly because of bulk and partly because they have proved difficult and costly to manufacture.

The present invention has for its principal object an improved method of manufacturing thin, flat primary galvanic cells.

The accompanying drawing sets forth a flow sheet of the method of this invention and also illustrates somewhat diagrammatically the components of the cell at each step of its manufacture.

The method of the invention is based on the concept of producing a cathode laminate or subassembly and an anode laminate or subassembly in separate operations and combining the two laminates to complete the cell. The method includes the steps of providing an electrically conductive film of thermoplastic resin, covering one entire surface of the film with cathode mix and applying a separator to the cathode mix. A layer of immobilized electrolyte is supplied for the cell and may be applied to the separator to complete the cathode laminate or may be applied simultaneously with the anode laminate or before the laminates are brought together. In either case, the cathode laminate is placed upon a web of electrically nonconductive heat-sealable thermoplastic film material which is provided with a substantially centrally located aperture for making electric contact to the electrically conductive film which serves as the cathode collector of the completed cell. The cathode subassembly is placed upon the web in such fashion as to have a marginal portion about the entire cathode collector.

The anode laminate is prepared from a metal sheet which will serve as the anode of the completed cell. Onto one surface of it is secured a second web of electrically nonconductive thermoplastic film similarly provided with an aperture for making contact to the metal and similarly arranged with marginal portions extending outwardly of the periphery of the metal sheet. The opposite surface of the metal sheet is provided with a layer of viscous electrolyte paste backed by a separator of microporous paper. The anode laminate should be larger than the cathode laminate.

The anode and cathode laminates or subassemblies so prepared are placed in juxtaposition with the two separator layers in contact with each other and in such position that a margin of anode laminate surrounds the edges of the cathode laminate. The marginal portions of each plastic web are in overlapping relationship. After application of pressure to eliminate entrapped air between the cell components and to insure intimate contact therebetween, the marginal portions of the two webs are sealed together, preferably by heat sealing. To complete the cell a sheet of metal foil is secured to the web on which the cathode laminate was placed, and the foil is deformed through the aperture in the web to make physical and electrical contact with the cathode collector film.

More specifically with reference to the drawing a cathode laminate is prepared by providing a film 10 of electrically conductive thermoplastic material such as a vinyl film loaded with carbon, available commercially under the trade name Condulon. Onto the film 10 is placed a cathode 12 by extrusion, printing, stencilling or doctoring. The cathode 10 may be the conventional Leclanche cathode mix of finely divided manganese dioxide and carbon particles. The cathode 12 is commensurate in size with the film 10. A separator 14 of conventional separator material such as microporous paper is placed on top of the cathode 12. In the embodiment of the invention shown, the cathode laminate is now placed on a web 16 of electrically nonconductive heat-sealable thermoplastic film having a margin 18 extending outwardly of the periphery of the film 10. A central aperture in the web 16 is not visible.

To prepare the anode laminate a sheet 20 of anode metal such as zinc is provided. It is larger than the cathode laminate. As shown, a layer 22 of electrolyte is applied to one surface of the sheet 20 and above it is a separator 14a. In the Leclanche system the electrolyte is an aqueous solution of ammonium chloride usually containing zinc chloride which is immobilized to form a paste. The layer 22 may be applied by printing or stencilling technique. The electrolyte-coated anode sheet 20 is now placed on a web 24 of the same material as the web 16. The web 24 has a marginal portion 26 extending outwardly of the sheet 20 about its entire periphery. This completes the anode laminate.

The cathode laminate and anode laminate are now aligned, as shown with the cathode laminate being bottommost and the anode laminate being turned over to place the separator 14a in contact with the separator 14 and the marginal portions 18, 26 of the webs 16, 24 overlapping. The marginal portions of the anode laminate surround the edges of the cathode laminate. As shown an aperture 28 in the anode web 24 provides access to the anode 20 for electrical connection. The marginal portions of the webs 16, 24 are sealed together, preferably by conventional heat sealing, forming a seal 30 entirely surrounding the edges of the cell.

To strengthen the cell as well as to improve contact with the cathode a metal foil 32, for example, tin-coated steel is adhesively secured to the outside of the web 16 and is deformed through the aperture 34 of the web 16 into contact with the cathode collector film 10. The cell is now complete.

It should be apparent that the method of the invention is especially suited to continuous operation. The films may be fed from rolls onto appropriate platens. Similarly, it is pointed out that the method is not limited to the manufacture of cells in any particular electrochemical system.

I claim:

1. A method of manufacturing a thin flat film primary galvanic cell, which method comprises:
   providing a thin film of electrically conductive plastic material;
   depositing a uniformly thin layer of cathodic depolarizer mix on one entire surface of said film;
   covering said depolarizer mix layer with a thin sheet of electrolyte-permeable separator material, thus producing a cathode laminate of conductive film, depolarizer mix and separator;
   applying said laminate to a web of electrically nonconductive heat-sealable plastic film having at least one perforation therein substantially central of the width thereof, said web extending marginally beyond the entire periphery of said laminate;
   preparing an anode laminate by providing on a thin sheet of anode metal a separator and a viscous electrolyte paste;
   placing said sheet on a second web of electrically nonconductive heat-sealable plastic film having at least one aperture substantially central of the width thereof, said web extending marginally beyond the entire periphery of said laminate;
   providing a layer of immobilized electrolyte for said cell;
   justaposing said cathode laminate and said anode laminate with said electrolyte layer and said separators between said anode metal and said depolarizer mix and said marginally extending portions of both said webs adjacent each other;
   sealing said webs together in said marginal portions;
   applying a metallic foil to the outer surface of said first-mentioned web;

and deforming said foil through the aperture in said first-mentioned web to make electrical contact to said electrically conductive film.

2. A method as defined by claim 1 in which an electrolyte layer is placed on the surface of said depolarizer mix before said anode laminate is placed in juxtaposition to said cathode laminate.

3. A method as defined by claim 1 in which said anode laminate is marginally larger than said cathode laminate and where said laminates are juxtaposed the marginal portions of said anode laminate surround said cathode laminate.